US006628327B1

(12) United States Patent
Aoki et al.

(10) Patent No.: US 6,628,327 B1
(45) Date of Patent: Sep. 30, 2003

(54) METHOD AND A SYSTEM FOR IMPROVING RESOLUTION IN COLOR IMAGE DATA GENERATED BY A COLOR IMAGE SENSOR

(75) Inventors: Shin Aoki, Kanagawa (JP); Haike Guan, Kanagawa (JP)

(73) Assignee: Ricoh Co., LTD, Tokyo (JP)

( * ) Notice: Subject to any disclaimer, the term of this patent is extended or adjusted under 35 U.S.C. 154(b) by 0 days.

(21) Appl. No.: 09/004,151

(22) Filed: Jan. 7, 1998

(65) Prior Publication Data

(65)

(30) Foreign Application Priority Data

Jan. 8, 1997 (JP) ........................................ 9-001094

(51) Int. Cl.[7] ........................................ H04N 5/228

(52) U.S. Cl. ........................................ 348/221.1; 348/272

(58) Field of Search ........................................ 348/297, 298, 348/222, 234, 266, 272, 630, 708, 712, 713, 273, 237, 235, 645, 663, 665, 666, 667, 715; 382/162; 358/518

(56) References Cited

U.S. PATENT DOCUMENTS 4,992,861 A * 2/1991 D'Errico ..................... 358/500
5,333,055 A * 7/1994 Murata et al. .............. 348/239
5,477,345 A * 12/1995 Tse ........................... 348/272
5,521,637 A * 5/1996 Asaida et al. ............... 348/222
5,565,931 A * 10/1996 Girod ......................... 348/254
5,596,367 A * 1/1997 Hamilton, Jr. et al. ...... 348/266
5,608,824 A * 3/1997 Shimizu et al. ............. 382/276
5,909,254 A * 6/1999 Feig et al. .................. 348/660
6,040,858 A * 3/2000 Ikeda ......................... 348/242

FOREIGN PATENT DOCUMENTS

JP 2-153679 6/1990
JP 2-239791 9/1990
JP 407093563 A * 4/1995 ............. G06T/9/20
JP 7-123421 5/1995
WO WO 94/18801 A1 * 8/1994 ............ H04N/9/07

* cited by examiner

*Primary Examiner*—Andrew Christensen
*Assistant Examiner*—Eric Wisdahl
(74) *Attorney, Agent, or Firm*—Knoble & Yoshida, LLC

(57) ABSTRACT

An intensity value is independently estimated based upon interpolated values as well as measured sensor values according to the location of an individual sensor within a sensor unit. The interpolated values are in either CrCb or RGB values while an estimated intensity value is in Y value. The independent intensity value substantially improves color resolution.

19 Claims, 11 Drawing Sheets

図 1: 独立輝度推定

図 1: 独立輝度推定

FIG. 12A
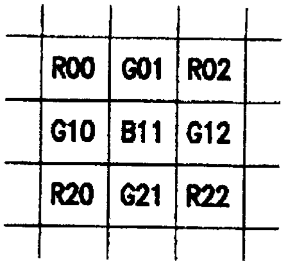
FIG. 12B
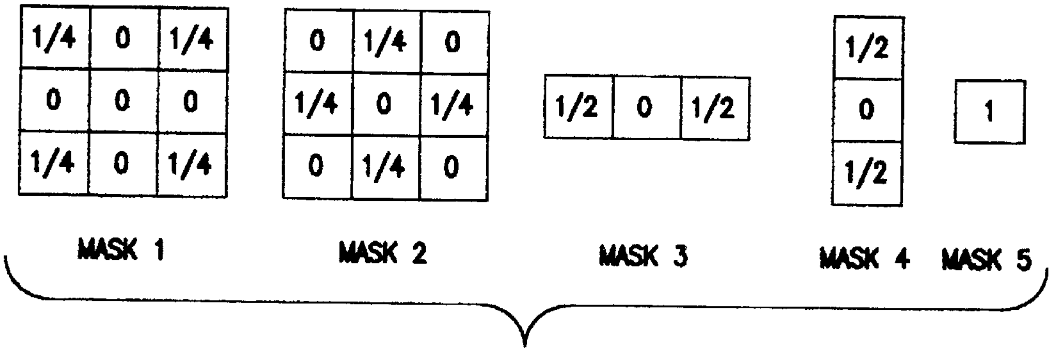
FIG. 12C
| POSITION | R | G | B |
|---|---|---|---|
| R | MASK 5 | MASK 2 | MASK 1 |
| G0 | MASK 3 | MASK 5 | MASK 4 |
| G1 | MASK 4 | MASK 5 | MASK 3 |
| B | MASK 1 | MASK 2 | MASK 5 |

FIG. 13A

| | | |
|---|---|---|
| 1 | 2 | 1 |
| 3 | 1 | 3 |
| 1 | 2 | 1 |

FIG. 13B

| | | |
|---|---|---|
| 0 | Cr2/2 | 0 |
| Cr3/2 | Cr1 | Cr3/2 |
| 0 | Cr2/2 | 0 |

FIG. 13C

| | | |
|---|---|---|
| 0 | Cb2/2 | 0 |
| Cb3/2 | Cr1 | Cb3/2 |
| 0 | Cr2/2 | 0 |

METHOD AND A SYSTEM FOR IMPROVING RESOLUTION IN COLOR IMAGE DATA GENERATED BY A COLOR IMAGE SENSOR

FIELD OF THE INVENTION

The current invention is generally related to a method and a system for improving the resolution of color image data in image reproduction machines such as a digital camera and a digital scanner, and more particularly related to the method and the system for independently estimating an intensity value based upon chromaticity values as well as measured sensor values.

BACKGROUND OF THE INVENTION

In image reproduction machines including a digital camera and a digital scanner, an image photo sensor such as a capacitor coupled device (CCD) includes a group of color-component specific photo elements. These color-component specific photo elements are arranged in a predetermined spatial pattern on a single plane. For example, FIG. 1A illustrates a one-dimensional photo sensor element strip, and a set of red (R), green (G) and blue (B) color-component specific photo sensitive elements is repeated in one dimension. FIG. 1B illustrates a two-dimensional photo sensor, and one exemplary spatial pattern unit of RGB photo elements each consists of five G-sensitive photo elements, two R-sensitive photo elements and two B-sensitive photo elements. These spatially distributed RGB photo sensors generate an image for respective pixels.

Now referring to FIG. 2, the above described one-dimensional single-layer RGB photo sensor array unit generates only one color value for the corresponding CCD or CCD data. The CCD data is processed to ultimately generate three sets of color values for each pixel or CCD in a color image. In particular, the one-dimensional single-layer RGB photo sensor array unit initially generates spatially distributed RGB values or CCD data. For example, since R-sensitive photo sensor elements are located at the first and fourth positions in the array unit, the R CCD data is available only at these two positions. Similarly, G CCD data is available only at the second and fifth positions while B CCD data is available at the third and sixth positions. Based upon the above described fragmented CCD data, the three sets of contiguous color values are generated according to a predetermined process such as interpolation for an improved color image.

The above described image photo sensor units generally have two undesirable features. One of the undesirable features is caused by the spatial location of the RGB photo elements on a single plane. Since the RGB photo sensors are not stacked on top of each other at an identical location with respect to an object image to be reproduced, an exact location of the object image that each of these RGB photo elements reproduces is not identical. In other words, each of the RGB elements generates a slightly different portion of the object image. Because of this spatial distribution of the photo sensors, the reproduced object image is somewhat distorted in its colors.

The other undesirable feature is related to resolution. Since color at one pixel is determined based upon a set of color-component specific photo elements such as a set of RGB elements, the resolution of the reproduced image is reduced by a number of photo elements required for one pixel in determining color. In contrast, if an achromatic image is reproduced, since each pixel directly corresponds to a portion of an output image, the resolution is directly related to the number of photo elements.

To solve the above described problems, prior attempts include Japanese Laid Open Publication Hei 2-153679 which discloses a method of interpolating pixel color output values. Referring to FIG. 3, the R color-component values are interpolated in a one-dimensional single plane photo sensor strip as shown in FIG. 1A. Since the R photo sensors exist only at positions 1 and 4, the R values are interpolated at positions 2 and 3 based upon the R output values at the positions 1 and 4. The following equations (1):

$$R(2) = \frac{2R(1) + R(4)}{3} \qquad (1)$$

$$R(3) = \frac{R(1) + 2R(4)}{3}$$

Similar interpolation is performed for other color components. Although the above interpolation method somewhat improves color distortion, because the interpolated values are always within a range of actually measured values, the improved output range is still limited to the measured range.

Another prior art attempt, Japanese Laid Open Publications Hei 2-239791 and Hei 7-123421 disclose methods for increasing resolution in image reproduction. The methods assume that a set of color-component specific photo sensors each has identical response sensitivity to achromatic light and that an image is achromatic. The intensity output from each photo sensor is now used for generating an image thereby increasing resolution. For example, referring to FIG. 4 even though individual photo elements are color-component specific such as R, G and B, only monochromatic intensity is considered. However, when the sensitivities are not identical and or the image is not achromatic, the sensitivities may be adjusted for a particular color component if relative color-component sensitivity response curves of the photo elements are known. The above described approach is useful only for a single color-component output and is not practical for chromatic images in general.

In order to avoid the above described unresolved problems in improving the resolution of an image generated by the single-plane color photo sensor, it is desired to process photo sensor signals according to a predetermined spatial distribution pattern of the color-component. Furthermore, it remains desirable to process the photo sensor signals in such a way to generate intensity signals which substantially improve the above described color distortion problem.

SUMMARY OF THE INVENTION

In order to solve the above and other problems, according to a first aspect of the current invention, a method of improving resolution in color image data, includes the steps of: a) inputting color image data from a sensor having a specific unit pattern of color-component specific photo elements; b) generating chroma values for each of the color-component specific elements from the color image data; c) adjusting the chroma values according to the specific pattern of the color-component specific elements; and d) estimating an intensity value based upon the chroma values adjusted in the step c) and the color image data from the step a).

According to a second aspect of the current invention, a system for improving resolution in color image data, includes: a single-plane color image sensor having a predetermined spatial pattern of color-component specific photo elements for generating color image data; an interpolated chroma value generator connected to said single-plane color image sensor for generating interpolated chroma values according to the spatial pattern; and an intensity estimator connected to the interpolated chroma value generator and the single-plane color image sensor for estimating an intensity value based upon the interpolated chroma values and the color image data.

According to a third aspect of the current invention, a program storage device readable by a machine, tangibly embodying a program of instructions executable by the machine to perform method steps of reproducing a high-resolution image, the method steps including: j) inputting color image data from a sensor having a specific unit pattern of color-component specific photo elements; k) generating chroma values for each of the color-component specific elements from the color image data; l) adjusting the chroma values according to the specific pattern of the color-component specific elements; m) further adjusting the chroma values for smoothing the chroma values adjusted in the step l); n) estimating an intensity value based upon the chroma values twice adjusted in the steps l) and m) and the color image data from the step j); o) adjusting the intensity value for an improved edge characteristic after the step n); and p) generating RGB data based upon the chroma values adjusted in the step m) and the intensity value adjusted in the step o).

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIGS. 12A, 12B and 12C respectively illustrate an exemplary photo sensor unit, a set of corresponding filters or masks and a table summarizing a combination of the masks used in interpolating the sensor values.

FIGS. 13A, 13B and 13C respectively illustrate an exemplary photo sensor unit and two filter masks for converting sensor values into chroma values.

DETAILED DESCRIPTION OF THE PREFERRED EMBODIMENT(S)

Figure 1A:
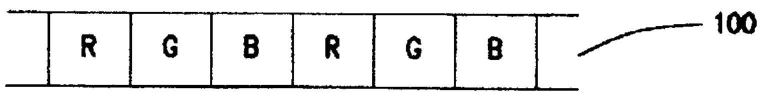
FIGS. 1A and 1B respectively illustrate one-dimensional and two-dimensional single layer photo sensor units.
Figure 1B:
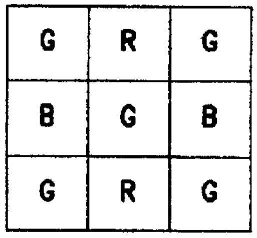
Figure 5:
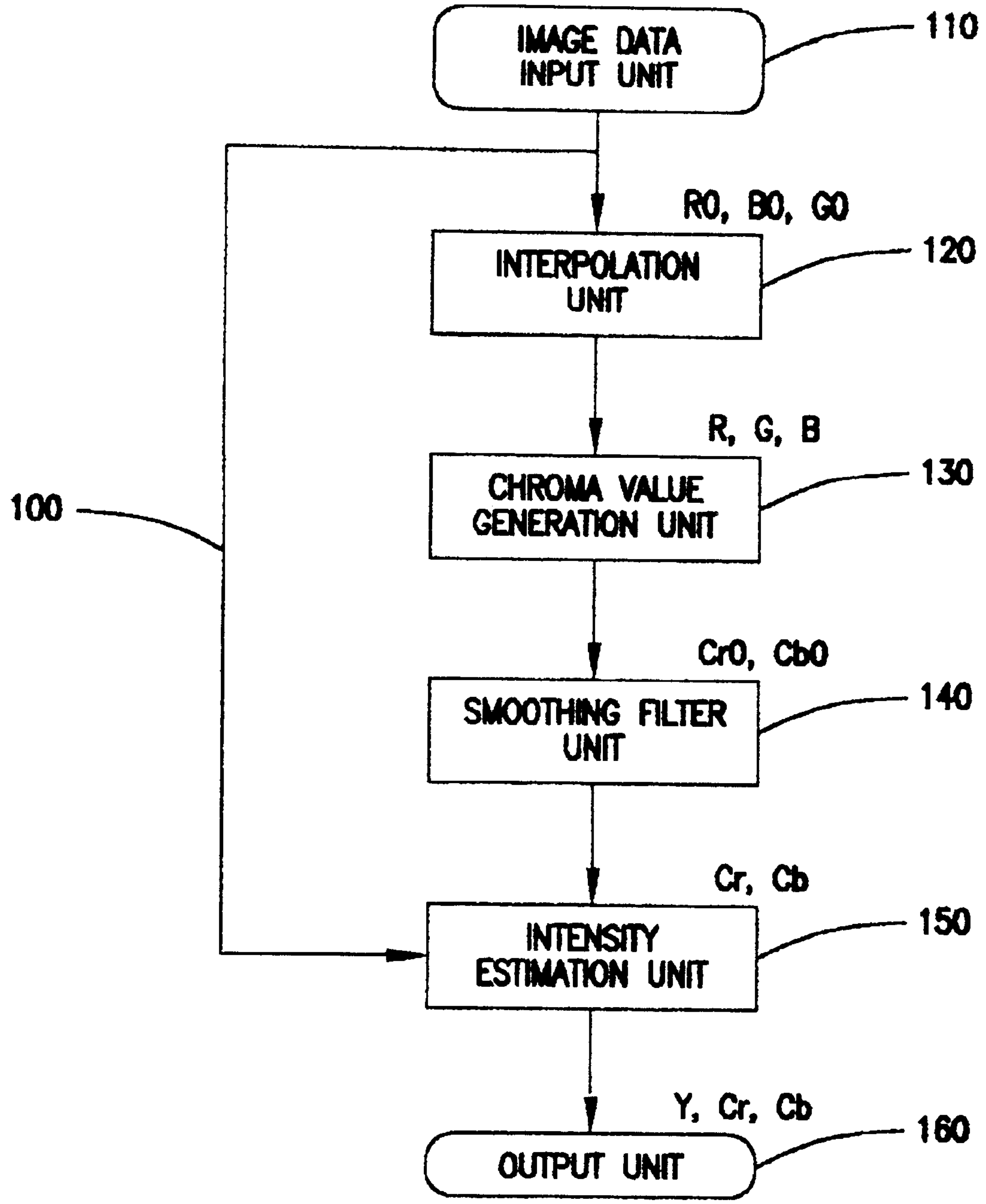
FIG. 5 is a block diagram illustrating a first preferred embodiment of the color resolution improving system according to the current invention.

Referring now to the drawings, wherein like reference numerals designate corresponding structure throughout the views, and referring in particular to FIG. 5, one preferred embodiment of the color image improving system according to the current invention includes an image data input unit 110, an interpolation unit 120, a chroma value generation unit 130, a smoothing filter unit 140, an intensity estimation unit 150 and an output unit 160. The image data input unit 110 includes a single-plane photo sensor consisting of photo-sensitive elements such as capacitor-coupled devices (CCD). These CCDs are arranged in a predetermined spatial pattern on a single plane and generally each generate respective color-component specific signals such as RGB signals. The spatial pattern is either one-dimensional or two-dimensional. One example of the two-dimensional spatial pattern of the RGB photo elements is illustrated in FIG. 1B.

Still referring to FIG. 5, the interpolation unit 120 interpolates RGB values in pixels whose color-component values are not measured. One preferred embodiment of the interpolation unit 120 according to the current invention interpolates the unmeasured values based upon adjacent measured values. One exemplary step of determining the interpolation values takes an average of the adjacent values. Another exemplary step of determining the interpolation values applies a predetermined mask or filter according to a specific pattern of the color-component specific elements to a measured value. Although the filter may be applied to measured RGB values or chroma CrCb values, the preferred embodiment interpolates the RGB values.

After the R0, G0 and B0 values are interpolated to R, G and B values, a chroma value generation or chromaticity conversion unit 130 further converts the interpolated values RGB values to chroma values Cr0 and Cb0. One preferred embodiment of the chroma value generation unit 130 includes a 2×3 matrix containing coefficients which spatially correspond to a specific set of color-component photo sensor elements. One example of the matrix multiplication is described in the following equation (2) for enabling a conversion between the NTSC-RGB and Cr–Cb color space.

$$\begin{bmatrix} Cr \\ Cb \end{bmatrix} = \begin{bmatrix} 100R - Y \\ 100B - Y \end{bmatrix} \tag{2}$$

where RGB values range from 0 to 1 while Y ranges from 0 to 100. Furthermore, XYZ is defined as follows in an equation (3).

$$\begin{bmatrix} X \\ Y \\ Z \end{bmatrix} = M \begin{bmatrix} R \\ G \\ B \end{bmatrix}, M = \begin{bmatrix} 60.69927 & 17.34486 & 20.05713 \\ 29.89665 & 58.64214 & 11.46122 \\ 0.00000 & 6.607565 & 88.53878 \end{bmatrix} \quad (3)$$

Where M is a 3x3 matrix. From the above equations (2) and (3), the relationship between the RGB and YCrCb values is described as follows in the following equation (4):

$$\begin{bmatrix} Y \\ Cr \\ Cb \end{bmatrix} = N \begin{bmatrix} R \\ G \\ B \end{bmatrix}, N = \begin{bmatrix} 29.89665 & 58.64214 & 11.46122 \\ 70.10335 & -56.64214 & -11.46122 \\ -29.89665 & -58.64214 & 111.7469 \end{bmatrix} \quad (4)$$

where N is also a 3x3 matrix of coefficients. These coefficients are one exemplary set of values, and the matrix N is not limited to these particular values. Finally, Cr0 and Cb0 are determined more directly by the following equation (5).

$$Cr0 = n_{21}R1 + n_{22}G1 + n_{23}B1$$

$$Cb0 = n_{31}R1 + n_{32}G1 + n_{33}B1 \quad (5)$$

where Nij is an element in the N matrix in the above equation (4).

Still referring to FIG. 5, in a preferred embodiment of the current invention, a smoothing filter unit or a low pass filter 140 generally smoothes out the converted chroma values Cr0 and Cb0 in the image data. However, the smoothing filter unit 140 is not limited to the chroma values, and it is implemented to be applied to RGB values in an alternative embodiment. The smoothing filter unit 140 is particularly effective on smoothing color output near edges. After the chroma values for each pixel are processed in the above described edge process, the intensity estimation unit 150 estimates an intensity value based upon the chroma values as well as the original RGB values from the image data input unit 110. In general, the intensity estimation unit 150 estimates the intensity value independently for each photo sensor position. In other words, the spatial arrangement of the color-component specific photo sensors are accounted for the intensity estimation. As a result, the intensity values range in a spectrum equal to that of entire photo sensors.

In order to accomplish the above described tasks, the intensity estimation unit 150 solves for Y in the above equation (4) which relates the RGB and YCrCb color space. The intensity Y at a R color-component specific photo sensor position is determined as in the following set of equations (6):

$$Y = arR0 + brCr + crCb \quad (6)$$

$$ar = \left(n_{11} + \frac{n_{13}(n_{21}n_{32} - n_{22}n_{31}) + n_{12}(n_{23}n_{31} - n_{21}n_{33})}{n_{22}n_{33} - n_{23}n_{32}}\right)$$

$$br = \frac{n_{12}n_{33} - n_{13}n_{32}}{n_{22}n_{33} - n_{23}n_{32}}$$

$$cr = \frac{n_{13}n_{22} - n_{12}n_{23}}{n_{22}n_{33} - n_{23}n_{32}}$$

where R0, Cr and Cb are known variable while Y, is a unknown variable. $n_{ij}$ is an element in the N matrix in the above equation (4).

Similarly, the intensity Y at a G color-component specific photo sensor position is determined as in the following set of equations (7):

$$Y = agG0 + bgCr + cgCb \quad (7)$$

$$ag = \left(n_{12} + \frac{n_{13}(n_{22}n_{31} - n_{21}n_{32}) + n_{11}(n_{23}n_{32} - n_{22}n_{33})}{n_{21}n_{33} - n_{23}n_{31}}\right)$$

$$bg = \frac{n_{11}n_{33} - n_{13}n_{31}}{n_{21}n_{33}0N_{23}n_{31}}$$

$$cg = \frac{n_{13}n_{21} - n_{11}n_{23}}{n_{21}n_{33} - n_{23}n_{31}}$$

where G0, Cr and Cb are known variable while Y, R and B are unknown variable. $n_{ij}$ is an element in the N matrix in the above equation (4).

Lastly, the intensity Y at a B color-component specific photo sensor position is determined as in the following set of equations (8):

$$Y = abB0 + bbCr + cbCb \quad (8)$$

$$ab = \left(n_{13} + \frac{n_{12}(n_{23}n_{31} - n_{21}n_{33}) + n_{11}(n_{22}n_{33} - n_{23}n_{32})}{n_{21}n_{32} - n_{22}n_{31}}\right)$$

$$bb = \frac{n_{11}n_{32} - n_{12}n_{31}}{n_{21}n_{32} - n_{22}n_{31}}$$

$$cb = \frac{n_{12}n_{21} - n_{11}n_{22}}{n_{21}n_{32} - n_{22}n_{31}}$$

where B0, Cr and Cb are known variable while Y, R and G are unknown variable. $n_{ij}$ is an element in the N matrix in the above equation (4).

The above equation sets (6)–(8) are each solved for the intensity value Y by simple additions provided that respective coefficients (ar, br, cr), (ag, bg, cg) and (ab, bb, cb) are precalculated. In one preferred embodiment according to the current invention, the intensity estimation unit 150 stores the above three sets of the coefficients and selects one of the sets depending upon the position of the color-component specific photo sensor. Thus, based upon the R0, B0 and G0 signals and the chromaticity values Cr and Cb, the intensity estimation unit 150 estimates the intensity values, and the output unit 160 outputs the improved Y, Cr and Cb signals.

Figure 6:
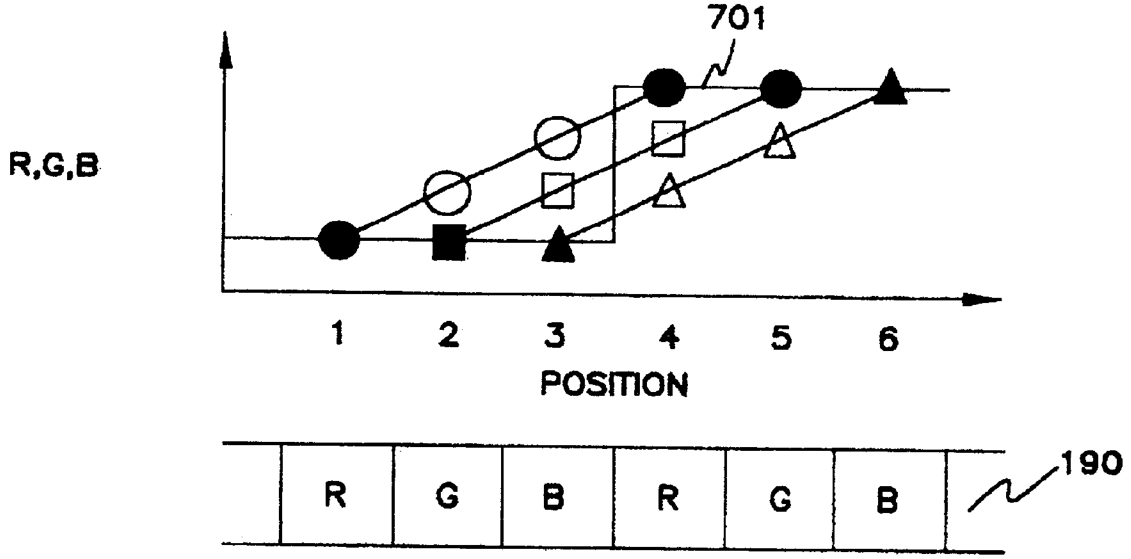
FIG. 6 illustrates how an undesirable feature in color components occurs near an edge area.

Now referring to FIG. 6, areas such as an edge suddenly change in intensity, and the interpolation in these areas is not generally accomplished in an esthetically pleasing manner. Color-component specific photo sensors 190 are positioned in one dimension near an edge 701. Only intensity values of these photo sensors 190 are considered. Filled circles, squares and triangles respectively represent actual intensity values of R, G and B photo sensors while unfilled circles, squares and triangles respectively represent interpolated R, G and B values. Near positions 2 through 5, the intensity values of the interpolated R, G and B values differ and have a color relation such as R>G>B. Consequently, near the edge, since the intensity values differ among the color components, inaccurate colors or intensities are reproduced. In order to substantially eliminate the above color-component discrepancy near edge areas, in one preferred embodiment according to the current invention, a smoothing filter unit includes a spatial filter whose function is described by the following equations (9).

$$Cr_i = \sum_{j=i-3}^{i+3} Cr0j/7 \quad (9)$$

-continued $$Cb_i = \sum_{j=i-3}^{i+3} Cb0j/7$$

The above described digital filter smooths the intensity values of an edge area including seven contiguous pixels which are symmetrically taken from both left and right sides.

Figure 7:
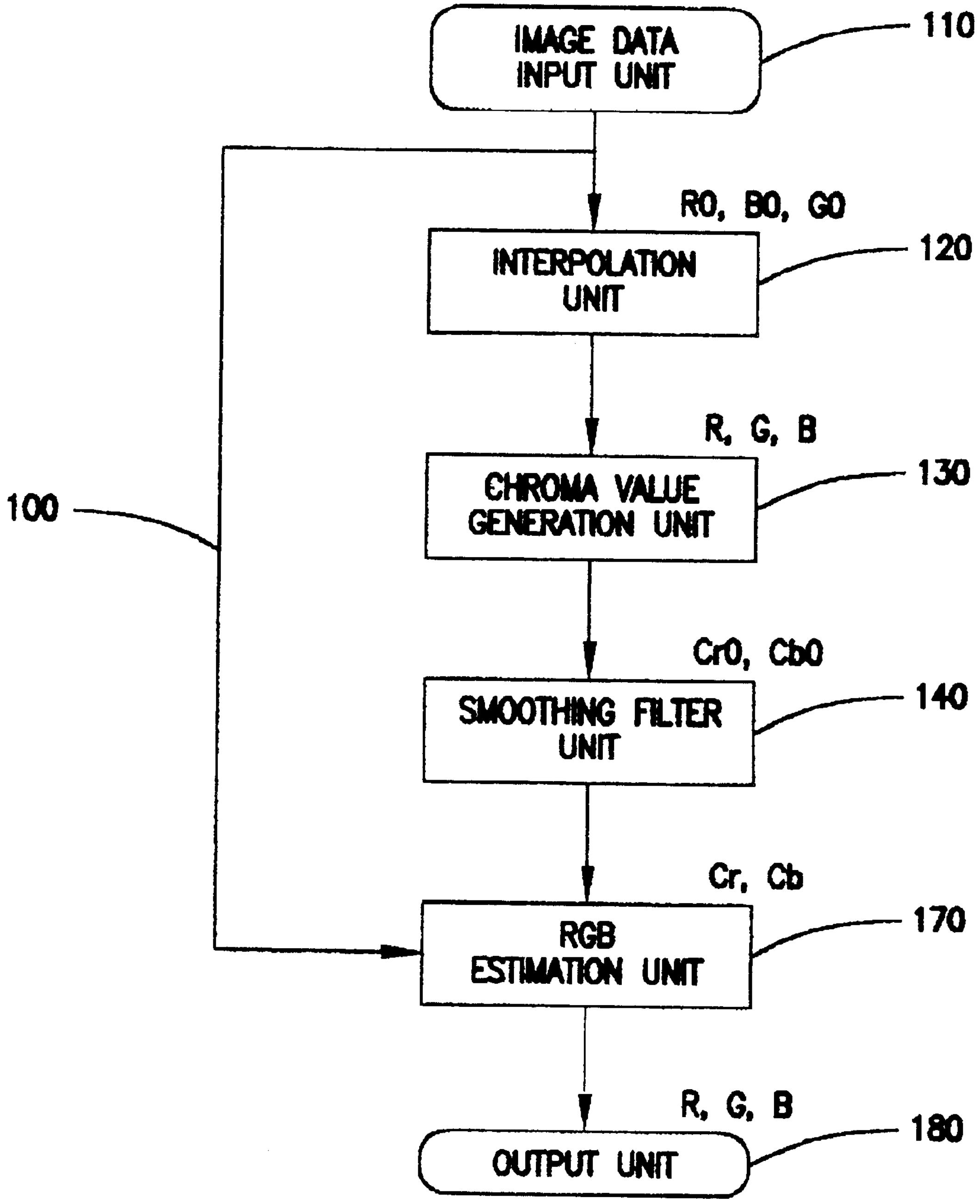
FIG. 7 is a block diagram illustrating a second preferred embodiment of the color resolution improving system according to the current invention.

Referring to FIG. 7, a second preferred embodiment of the color image improving system according to the current invention includes an image data input unit 110, an interpolation unit 120, a chroma value generation unit 130, a smoothing filter unit 140, a RGB value estimation unit 170 and an output unit 180. In the second embodiment, the G and B values are estimated assuming that Cr, Cb and R0 in the above equation are known variables. G and B values at a R color-component specific photo sensor position are determined based upon the following set of equations (10):

$$G = \frac{1}{n_{23}n_{32} - n_{22}n_{33}}((n_{21}n_{33} - n_{23}n_{31})R0 - n_{33}Cr + n_{23}Cb) \tag{10}$$

$$B = \frac{1}{n_{23}n_{32} - n_{22}n_{33}}((n_{22}n_{31} - n_{21}n_{32})R0 + n_{32}Cr - n_{22}Cb)$$

where $n_{ij}$ is an element in the N matrix in the above equation (4). Similarly, the R and B values are estimated assuming that Cr, Cb and G0 in the above equation are known variables. R and B values at a G color-component specific photo sensor position are determined based upon the following set of equations (11):

$$R = \frac{1}{n_{23}n_{31} - n_{21}n_{33}}((n_{22}n_{33} - n_{23}n_{32})G0 - n_{33}Cr + n_{23}Cb) \tag{11}$$

$$B = \frac{1}{n_{23}n_{31} - n_{21}n_{33}}((n_{21}n_{32} - n_{22}n_{31})G0 + n_{31}Cr - n_{21}Cb)$$

where $n_{ij}$ is an element in the N matrix in the above equation (4). Lastly, the R and G values are estimated assuming that Cr, Cb and B0 in the above equation are known variables. R and G values at a B color-component specific photo sensor position are determined based upon the following set of equations (12):

$$R = \frac{1}{n_{21}n_{32} - n_{22}n_{31}}((n_{22}n_{33} - n_{23}n_{32})B0 - n_{32}Cr + n_{22}Cb) \tag{12}$$

$$G = \frac{1}{n_{21}n_{32} - n_{22}n_{31}}((n_{23}n_{31} - n_{21}n_{33})B0 + n_{31}Cr - n_{21}Cb)$$

where $n_{ij}$ is an element in the N matrix in the above equation (4). Thus, based upon the R0, B0 and G0 signals and the chromaticity values Cr and Cb, the RGB estimation unit 170 estimates the RGB values, and the output unit 180 outputs the improved RGB signals.

Figure 8:
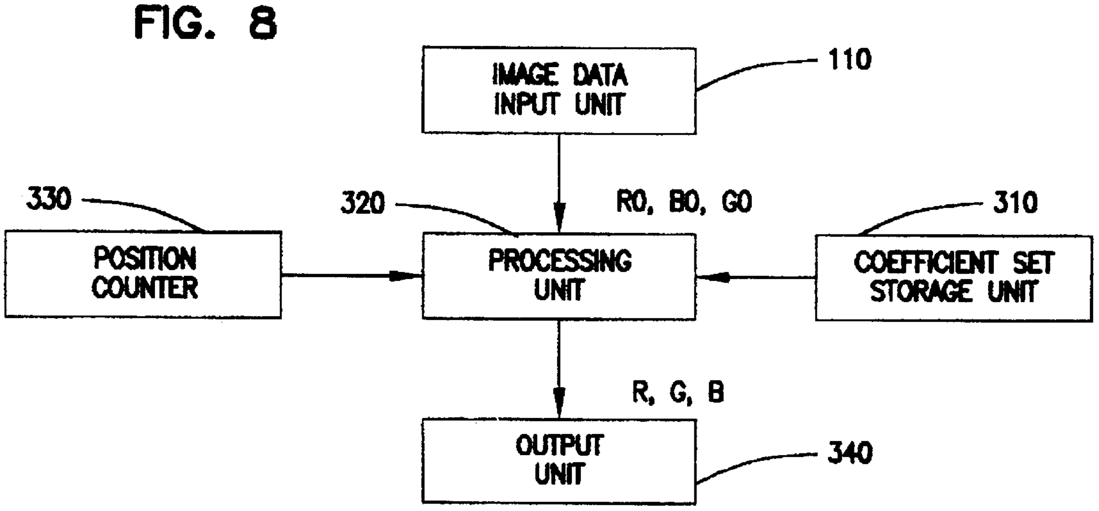
FIG. 8 is a block diagram illustrating a third preferred embodiment of the color resolution improving system according to the current invention.
Figure 2:
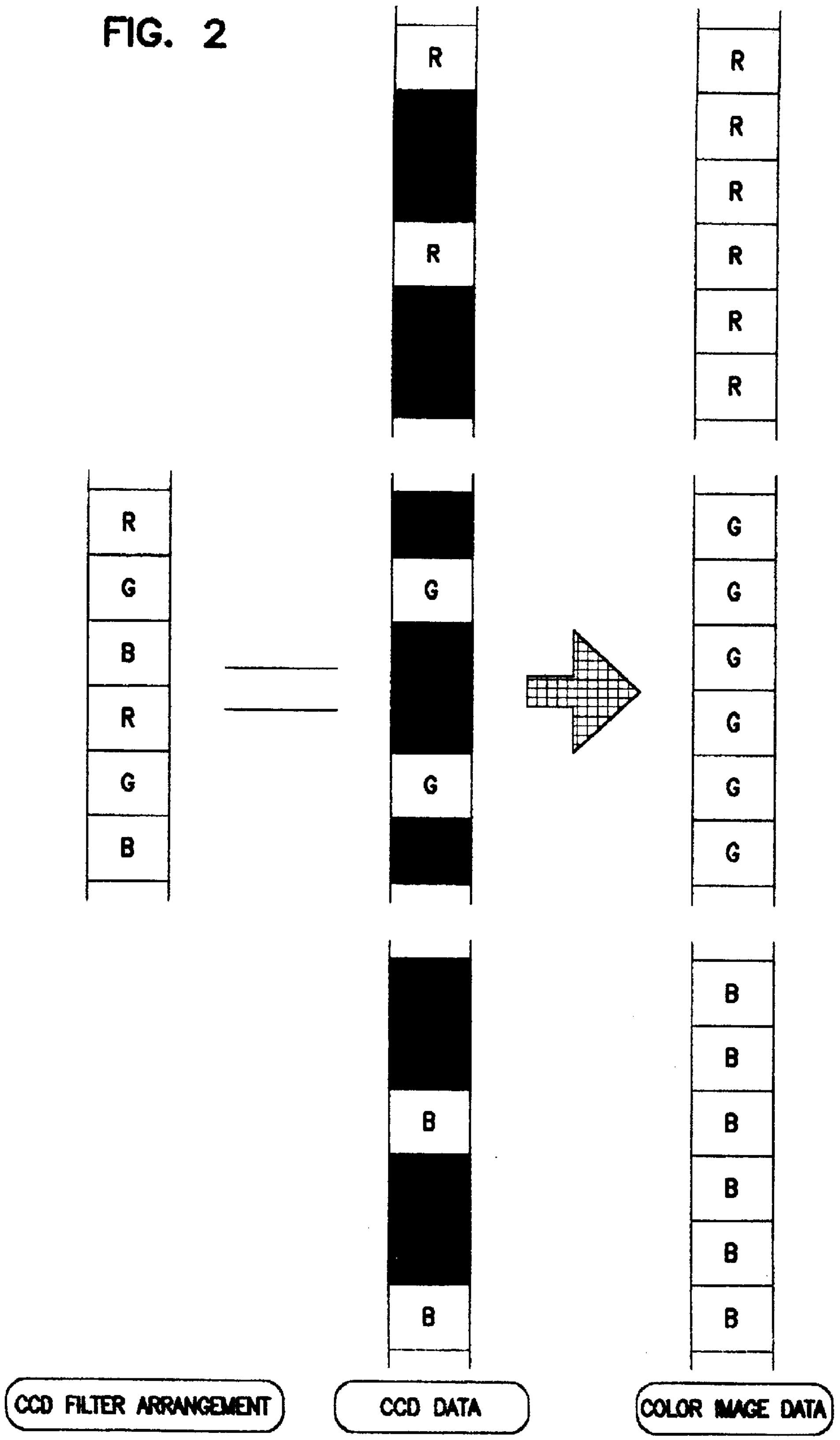
FIG. 2 illustrates that a one dimensional single layer photo sensor unit generates measured CCD data and the CCD data is interpolated for each color-component.
Figure 3:
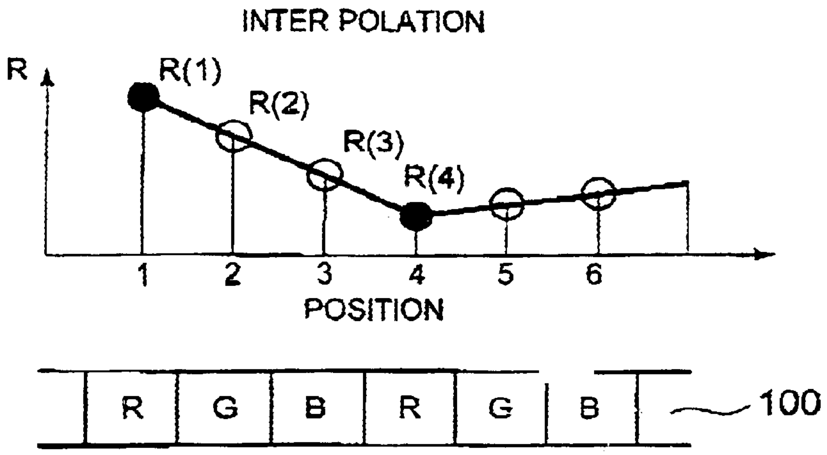
FIG. 3 illustrates exemplary R values from a photo sensor unit and the interpolation of the measured R values at G and B photo sensor element positions.
Figure 4:
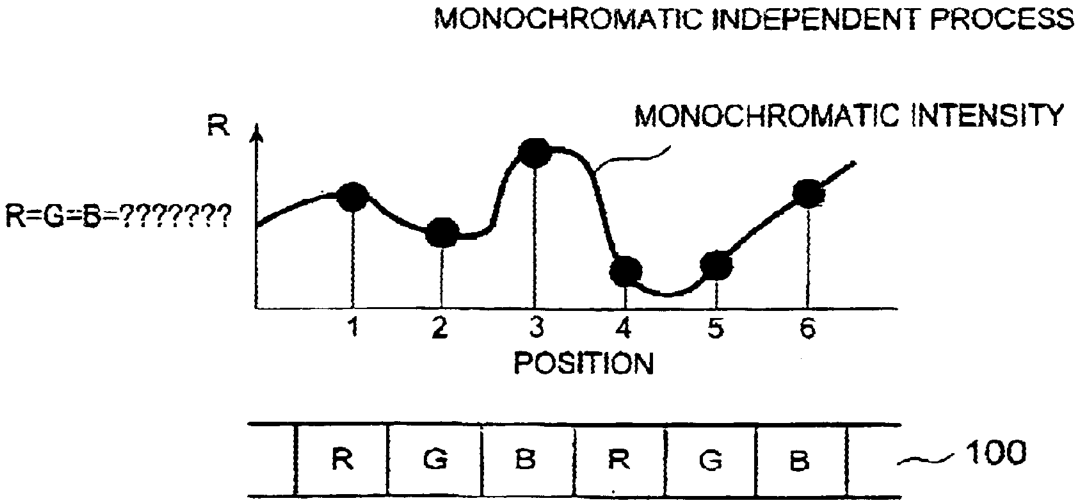
FIG. 4 illustrates exemplary mono chromatic intensity values at every sensor element position.

Referring to FIG. 8, a third preferred embodiment of the color image improving system according to the current invention includes an image data input unit 110, a position counter 330, a coefficient set storage unit 310, a processing unit 320 and an output unit 340. The coefficient set storage unit 310 stores three sets of the coefficients. The position counter 330 determines a pixel position in question to be one of the color-component specific photo sensor positions based upon the number of counts on pixels and selects a corresponding one of the coefficient sets. The selected coefficient set is inputted into the processing unit 320. The processing unit 320 determines RGB values for each of the color-component specific RGB photo sensors at a photo sensor position i. In other words, the processing unit 320 takes the photo sensor position i into account in determining the RGB values.

Figure 9:
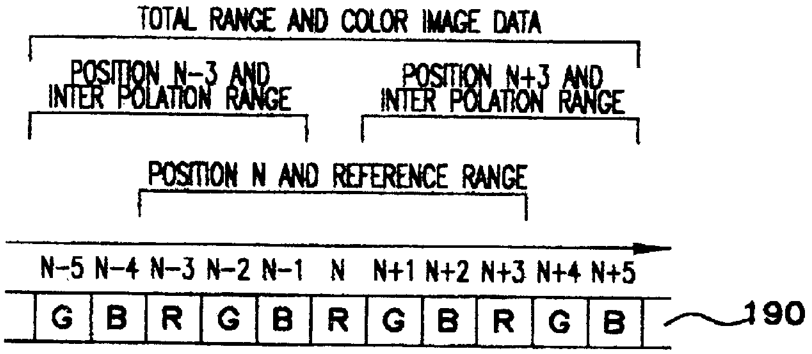
FIG. 9 illustrates a range of neighboring photo sensor elements which are taken into account in improving color image resolution.

Now referring to FIG. 9, to determine RGB values, for example, in reference to a R photo sensor at a position N, photo sensor values from positions ranging from a first position N−3 to a second position N+3 are considered. In order to interpolate R values, a first set of R values ranging from a third position N−5 to a fourth position N−1 are considered while a second set of R values ranging from a fifth position N+5 to a fourth position N+1 are considered. In other words, in order to generate color image data in reference to the R photo sensor at the position N, eleven photo sensor values are considered. According to this preferred process, the RGB values the photo sensor at the position N are directly obtained from the above equations (1), (5), (6) and (10) through (12).

To determine the RGB values of a pixel in question which corresponds to a R photo sensor at a position i, the following set of equations (13) describes the relations:

$$G = \frac{-n_{33} + n_{21} + n_{23}n_{31}}{n_{23}n_{32} - n_{22}n_{33}}\left(\frac{2}{7}R0_{i-3} - \frac{4}{7}R0_i + \frac{2}{7}R0_{i+3}\right) + \left(\frac{1}{21}G0_{i-5} + \frac{8}{21}G0_{i-2} + \frac{3}{7}G0_{i+1} + \frac{1}{7}G0_{i+4}\right) \tag{13}$$

$$B = \frac{n_{32}n_{21} - n_{22}n_{31}}{n_{23}n_{32} - n_{22}n_{33}}\left(\frac{2}{7}R0_{i-3} - \frac{4}{7}R0_i + \frac{2}{7}R0_{i-3}\right) + \left(\frac{1}{7}B0_{i-4} - \frac{3}{7}B0_{i-1} + \frac{8}{21}B0_{i-2} + \frac{1}{21}B0_{i+5}\right)$$

where $n_{ij}$ is an element in the N matrix in the above equation (4). Assuming that a pixel in question is R0i, surrounding pixels include R0i−3, R0i+3, G0i−5, G0i−2, G0i+1, G0i+4, B0i−4, B0i−1, B0i+2 and B0i+5, and the surrounding pixels are used to generate a product sum.

Similarly, to determine the RGB values of a pixel in question which corresponds to a G photo sensor at a position i, the following set of equations (14) describes the relations:

$$R = \left(\frac{1}{7}R0_{i-4} + \frac{3}{7}R0_{i+1} + \frac{8}{21}R0_{i+2} + \frac{1}{21}R0_{i+5}\right) + \frac{n_{33}n_{22} + n_{23}n_{32}}{n_{33}n_{31} - n_{21}n_{33}}\left(\frac{2}{7}G0_{i-3} - \frac{4}{7}G0_i + \frac{2}{7}G0_{i+3}\right) \tag{14}$$

$$B = \frac{n_{31}n_{22} - n_{21}n_{32}}{n_{23}n_{31} - n_{21}n_{33}}\left(\frac{2}{7}G0_{i-3} - \frac{4}{7}G0_i + \frac{2}{7}G0_{i+3}\right) + \left(\frac{1}{21}B0_{i+5} + \frac{8}{21}B0_{i-2} + \frac{3}{7}B0_{i+1} + \frac{1}{7}B0_{i+4}\right)$$

where $n_{ij}$ is an element in the N matrix in the above equation (4).

Lastly, to determine the RGB values of a pixel in question which corresponds to a B photo sensor at a position i, the following set of equations (15) describes the relations:

$$R = \left(\frac{1}{21}R0_{i-5} + \frac{8}{21}R0_{i-2} + \frac{3}{7}R0_{i+1} + \frac{1}{7}R0_{i+4}\right) + \frac{n_{32}n_{23} - n_{22}n_{33}}{n_{21}n_{32} - n_{22}n_{31}}\left(\frac{2}{7}B0_{i-3} - \frac{4}{7}B0_i + \frac{2}{7}B0_{i+3}\right) \tag{15}$$

$$G = \left(\frac{1}{7}G0_{i-4} + \frac{3}{7}G0_{i-1} + \frac{8}{21}G0_{i+2} + \frac{1}{21}G0_{i+5}\right) +$$

-continued $$\frac{-n_{31}n_{23}+n_{21}n_{33}}{n_{21}n_{32}-n_{22}n_{31}}\left(\frac{2}{7}B0_{i-3}-\frac{4}{7}B0_i+\frac{2}{7}B0_{i+3}\right)$$

where $n_{ij}$ is an element in the N matrix in the above equation (4).

Figure 10:
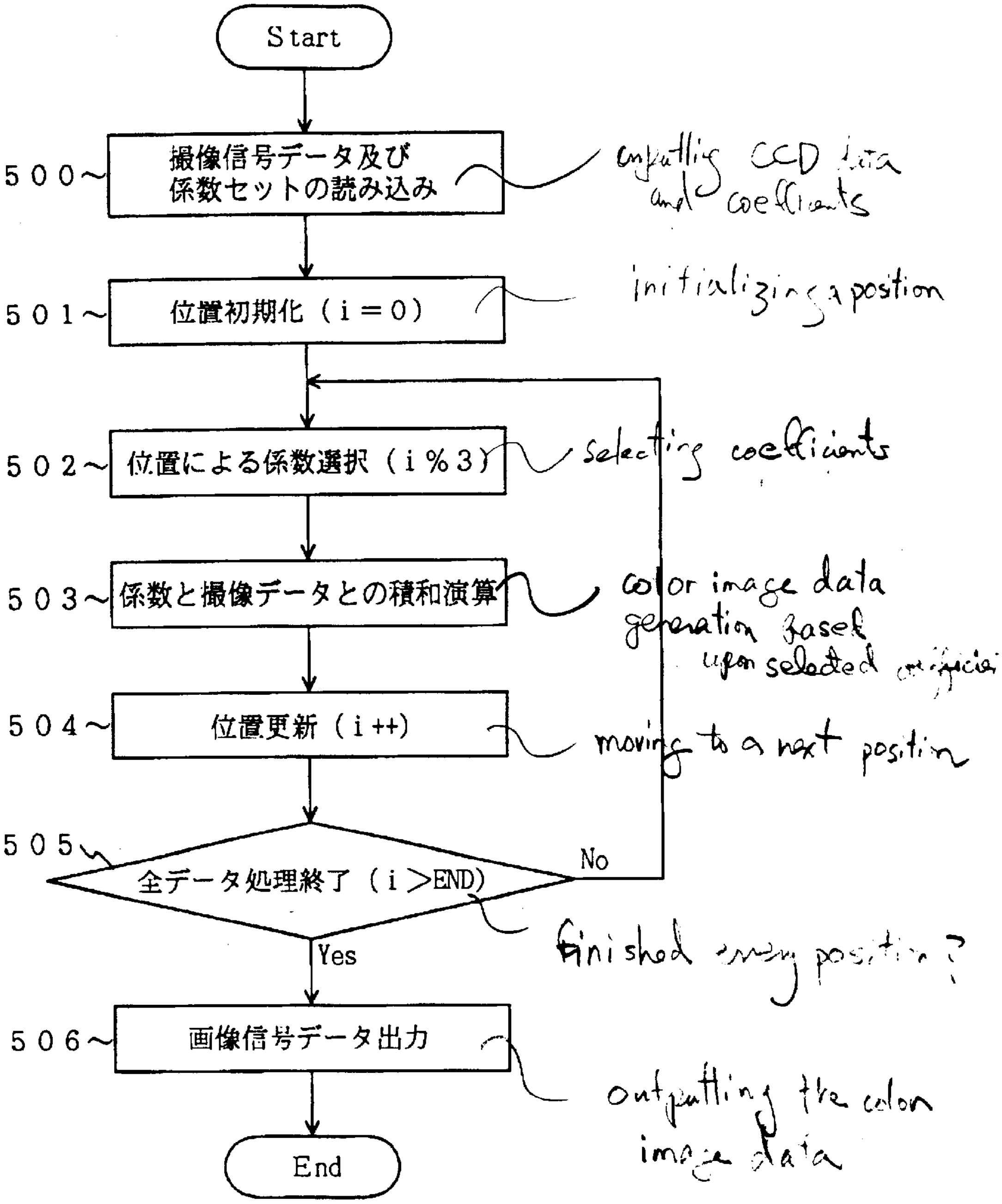
FIG. 10 is a flow chart illustrating steps involved in a method of improving color image resolution according to the current invention.

Now referring to FIG. 10, steps involved in one preferred process according to the current invention are illustrated in a flow chart. In a step 500, CCD values and sets of coefficients and equations are inputted. For example, the CCD values are in a RGB format while the coefficients are in a matrix format. A position index indicates a position of a pixel or photo sensor. After the position index i is initialized to zero in a step 501, a set of the coefficients and an appropriate equation set are selected based upon the position index in a step 502. For example, using a single-layered one-dimensional RGB photo sensor unit, the position is determined by a reminder of division by three. If a remainder is zero, the coefficients and the above equation (13) for a R photo sensor are selected. In a step 503, color image data is generated based upon the selected coefficient set and the selected equation. After the RGB value determination, in a step 504, a position is incremented by one for repeated the above described steps 502 through 504 until every pixel data is finished in a step 505. When all the pixels are processed, in a step 506, the processed color image data is outputted.

Figure 11:
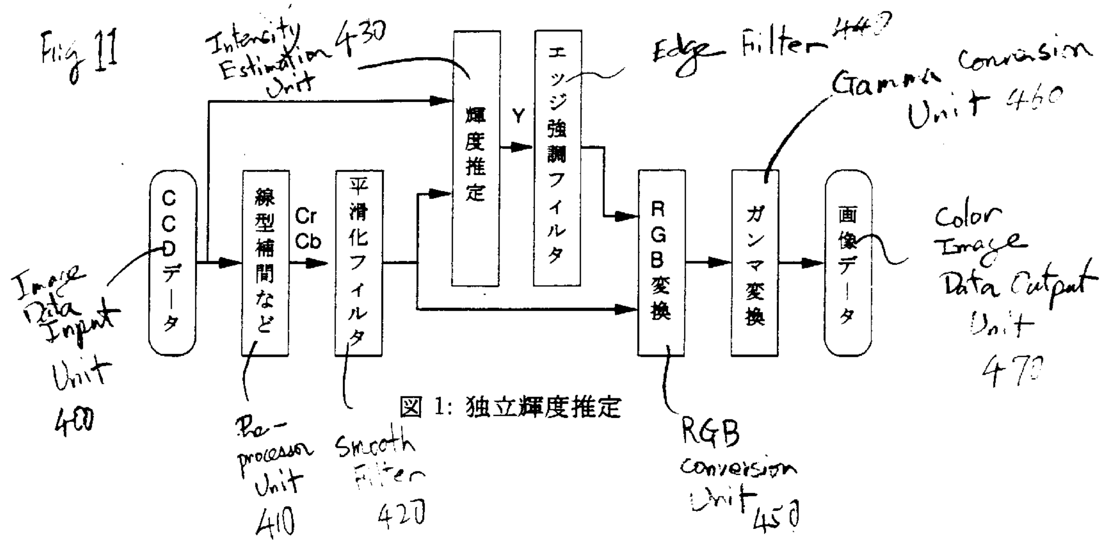
FIG. 11 is a block diagram illustrating a fourth preferred embodiment of the color resolution improving system according to the current invention.

Referring to FIG. 11, a fourth preferred embodiment of the color image improving system according to the current invention includes an image data input unit 400, a preprocessing unit 410, a smoothing filter unit 420, an intensity estimation unit 430, an edge filter 440, a RGB conversion unit 450, a gamma conversion unit 460 and a color image data output unit 470. The image data input unit 400 inputs CCD data or photo sensor measured values. The preprocessing unit 410 interpolates the values based upon the measured values as well as converts the RGB values into chroma values Cr and Cb. The smoothing filter 420 generally smooths out the converted chroma values Cr and Cb. The intensity estimation unit 430 independently estimates an intensity value Y of a pixel in question based upon the original CCD data and the interpolated and smoothed chromaticity values Cr and Cb. The edge filter unit 440 processes the estimated intensity Y values for sharpening edge areas. Finally, the RGB conversion unit 450 and the gamma conversion unit 460 respectively convert the edge filtered and the interpolated and smoothed chroma values Cr and Cb for outputting color image data via the color image data output unit 470.

Referring to FIG. 12A, one example of a two-dimensional single-layered photo sensor unit is illustrated. A letter indicates a color-specificity of the photo sensor while the corresponding number indicates a specific location. To interpolate color-specific values at a center position 11, the above described preprocessing unit 410 uses the following equation set (16) to interpolate:

$$R\mathbf{11}=(R\mathbf{00}+R\mathbf{02}+R\mathbf{20}+R\mathbf{22})/4$$

$$G\mathbf{11}=(G\mathbf{01}+G\mathbf{10}+G\mathbf{12}+G\mathbf{21})/4$$

$$B\mathbf{11}=B\mathbf{11} \tag{16}$$

At other photo sensor element locations, by using a combination of masks or filters such as illustrated in FIG. 12B, interpolation Values are obtained. The exemplary combinations of these masks are summarized in a table of FIG. 12C. Depending upon a position in the photo sensor unit, an original CCD value is multiplied by a fraction, zero or 1 in a mask specified in the table. The above described preprocessing unit 410 also converts the RGB values into YCrCb values based upon the following equation set (17):

$$Y=\mathrm{Kr}R+\mathrm{Kg}G+\mathrm{Kb}B$$

$$\mathrm{Cr}=R-Y=(1-\mathrm{Kr})R-\mathrm{Kg}G-\mathrm{Kb}B$$

$$\mathrm{Cb}=B-Y=-\mathrm{Kr}R-\mathrm{Kg}G+(1-\mathrm{Kb})B \tag{17}$$

where Kr=0.299, Kg=0.587 and Kb=0.114.

An alternative embodiment of the preprocessing unit according to the current invention includes an filter for converting CCD data to CrCb values. The conversion is generally expressed by the following equation (18):

$$\begin{bmatrix} Cr \\ Cb \end{bmatrix} = \begin{bmatrix} Cr1 & Cr2 & Cr3 \\ Cb1 & Cb2 & Cb3 \end{bmatrix} \cdot \begin{bmatrix} CCD1 \\ CCD2 \\ CCD3 \end{bmatrix} \tag{18}$$

For example, using a CCD array, conversion filters have type 1, type 2 and type 3 and are arranged as illustrated in FIG. 13A. A first filter mask as shown in FIG. 13B generates Cr values while a second filter mask as shown in FIG. 13C generates Cb values. The position of each CCD is independently taken into account in converting the CCD value into the chroma values Cr or Cb.

Another alternative embodiment of the intensity estimation unit according to the current invention relies upon the following relation for example, for a filter type 1 as described in equations (19) and (20).

$$\begin{bmatrix} Y \\ Cr \\ Cb \end{bmatrix} = \begin{bmatrix} C_R & C_G & C_B \\ 1-C_R & -C_G & -C_B \\ -C_R & -C_G & 1-C_B \end{bmatrix} \cdot \begin{bmatrix} R \\ G \\ B \end{bmatrix} \tag{19}$$

$$CCD\mathbf{1}=R\mathbf{1}\cdot R+G\mathbf{1}\cdot G+B\mathbf{1}\cdot B \tag{20}$$

where $C_R$, $C_G$ and $C_B$ are predetermined constants and R1, G1 and B1 are a portion of a matrix M in the following equation (21) by which the CCD values are converted to RGB values. The matrix M is determined based upon actual CCD measurements of known or measured RGB color image under predetermined conditions and minimal square approximation.

$$\begin{bmatrix} CCD1 \\ CCD2 \\ CCD3 \end{bmatrix} = M \cdot \begin{bmatrix} R \\ G \\ B \end{bmatrix} \tag{21}$$

$$M = \begin{bmatrix} R1 & G1 & B1 \\ R2 & G2 & B2 \\ R3 & G3 & B3 \end{bmatrix}$$

By solving the above equations (19) and (20) for an estimated intensity value Y, the RGB matrix is now canceled as follows in equations (22):

$$Y=Y_0\cdot CCD\mathbf{1}+Y_1\cdot \mathrm{Cr}+Y\cdot \mathrm{Cb}$$

$$Y_0=-C_G/C$$

$$Y_1=(R\mathbf{1}\cdot C_G-G\mathbf{1}\cdot C_R)/\mathrm{C}$$

$$Y\mathbf{2}=(B\mathbf{1}\cdot \mathrm{C}_G-G\mathbf{1}\cdot C_B)/\mathrm{C}$$

$$C=-G\mathbf{1}+G\mathbf{1}-C_R-R\mathbf{1}\cdot C_G-B\mathbf{1}\cdot C_G+G\mathbf{1}\cdot C_B \tag{22}$$

Thus, by determining $Y_0$, $Y_1$ and $Y_2$ for each filter type in advance, the intensity value is efficiently estimated based upon the CCD values and the chroma values Cr and Cb.

Figure 14:
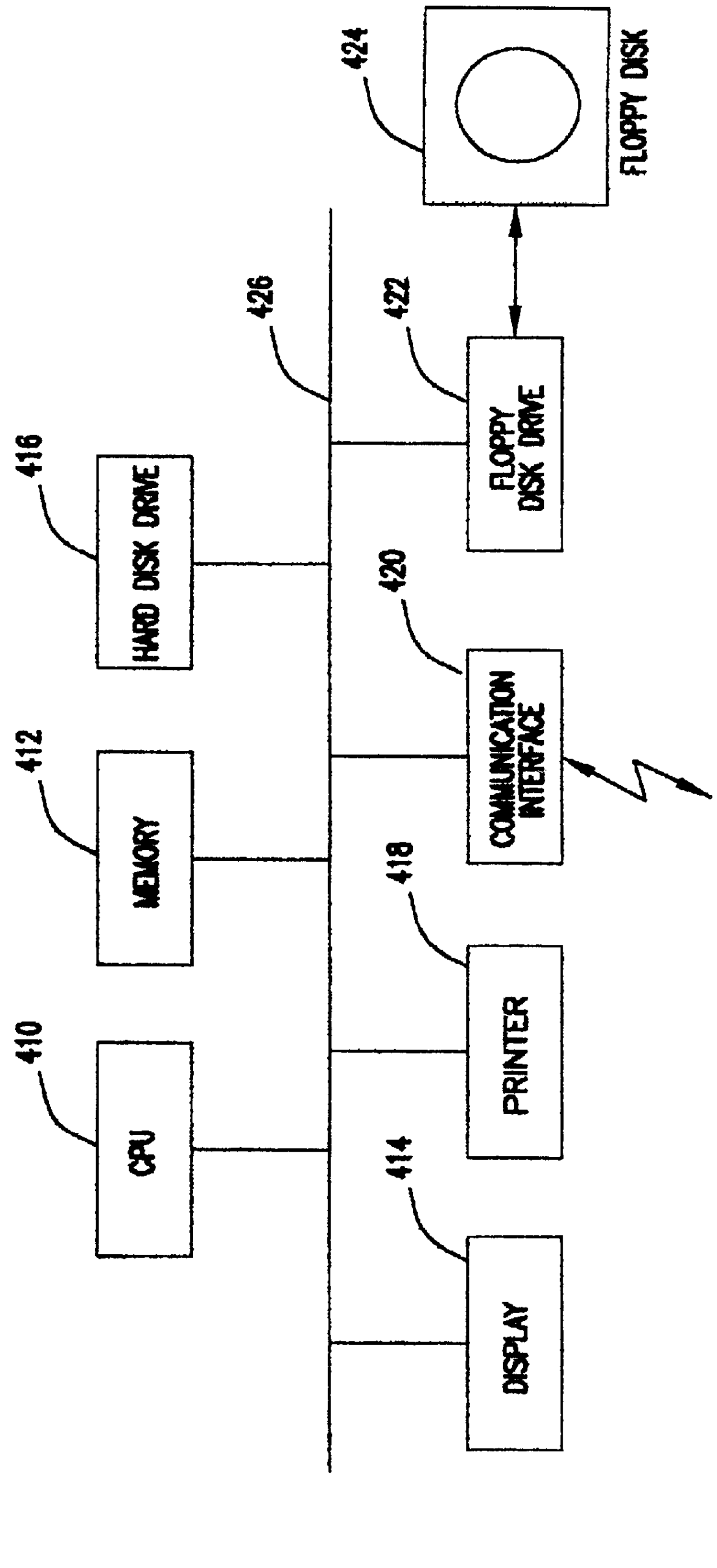
FIG. 14 is a block diagram illustrating a system for improving color resolution including a program storage device readable by a machine and tangibly embodying a program of instructions executable by the machine to perform method steps of reproducing a high-resolution image.

Now referring to FIG. 14, one preferred embodiment of the above described system for independently estimating an intensity value according to the current invention includes a program storage device readable by a machine such as a central processing unit (CPU) 410 and a memory 412, tangibly embodying a program of instructions executable by the CPU 410 to perform method steps of reproducing a high-resolution image. The program storage device further includes components such as a hard disk drive 416, a floppy disk 424, a floppy disk drive 422, and a remote storage unit accessed by a communication interface unit 420. The image software program from the above described storage unit improves the color image resolution, and the improved image is outputted to an output device such as a display unit 414 and a printer 418.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of improving resolution in color image data, comprising the steps of:

a) inputting color image data from a sensor having a specific unit pattern of color-component specific photo elements, the color image data being converted into a RGB data format based upon a predetermined matrix;

b) generating chroma values for each of the color-component specific elements from the color image data based upon a second predetermined matrix;

c) adjusting the chroma values according to the specific pattern of the color-component specific photo elements; and d) estimating an intensity value based upon the chroma values adjusted in said step c) and the color image data from said step a), the intensity value having a range equal to all of the color component specific photo elements, the intensity value being determined by the following equations, $$Y=(Y_0*CCD1)+(Y_1*C_r)+(Y_2*C_b)$$

$$Y_0=-C_G/C$$

$$Y_1=((R1*C_G)-(G1*C_R))/C$$

$$Y_2=((B1*C_G)-(G1*C_R))/C$$

$$C=-G1+(G1*C_R)-(R1*C_G)-(B1*C_G)+(G1*C_B)$$

Where Y is intensity of one of the color-component specific elements; CCD1 is a color image data value from a predetermined photo sensor element; $C_r$ and $C_t$ are the chroma values; R1, G1 and B1 are a portion of the first matrix; $C_R$, $C_B$ and $C_G$ are predetermined constants.

2. The method of improving resolution in color image data according to claim 1 further comprising the steps of:

e) further adjusting the chroma values for an improved color characteristic between said step c) and said step d);

f) adjusting the intensity value for an improved edge characteristic after said step d); and g) generating RGB data based upon the chroma values adjusted in said step e) and the intensity value adjusted in said step f).

3. The method of improving resolution in color image data according to claim 2 further comprising an additional step h) of gamma converting the RGB data after said step g).

4. The method of improving resolution in color image data according to claim 1 wherein the sensor obtains a color image on a single-plane color image sensor in said step a).

5. The method of improving resolution in color image data according to claim 1 further comprising an additional step i) of gamma converting the RGB data.

6. The method of improving resolution in color image data according to claim 1 wherein said first matrix and said second matrix are combined into a third matrix to be applicable in an additional step for replacing, said step a and said step b.

7. The method of improving resolution in color image data according to claim 1 wherein said step c) adjust the chroma values based upon a predetermined filter.

8. A system for improving resolution in color image data, comprising:

a single-plane color image sensor having a predetermined spatial pattern of color component specific photo elements for generating color image data;

an interpolated chroma value generator connected to said single-plane color image sensor for generating interpolated chroma values according to the spatial pattern; and an intensity estimator connected to said interpolated chroma value generator and said single-plane color image sensor for estimating an intensity value based upon the interpolated chroma values and the color image data, the intensity value having a range equal to all of the color-component specific photo elements in said singe-plane color image sensor, wherein said intensity estimator estimates the intensity value based upon following equations:

$$Y=(Y_0*CCD1)+(Y_1*C_r)+(Y_2*C_b)$$

$$Y_0=-C_G/C$$

$$Y_1=((R1*C_G)-(G1*C_R))/C$$

$$Y_2=((B1*C_G)-(G1*C_R))/C$$

$$C=-G1+(G1*C_R)-(R1*C_G)-(B1*C_G)+(G1*C_B)$$

Where Y is intensity of one of the color-component specific elements; CCD1 is a color image data value from a predetermined photo sensor element; $C_r$ and $C_b$ are the chroma values; R1, G1 and B1 are a portion of the first matrix; $C_R$, $C_B$ and $C_G$ are predetermined constants.

9. The system for improving resolution in color image data according to claim 8 wherein said interpolated chroma value generator further comprises a color-component specific spatial filter for interpolating the color image data and a convertor for converting the color image to the chroma values.

10. The system for improving resolution in color image data according to claim 8 further comprising a smoothing filter connected between said interpolated chroma value generator and said intensity estimator for reducing an error amount in the color image data.

11. The system for improving resolution in color image data according to claim 10 further comprising an edge enhancement filter connected to said intensity estimator for enhancing an edge.

12. The system for improving resolution in color image data according to claim 11 further comprising a RGB converter connected to said smoothing filter and said edge enhancement filter for generating a set of RGB data.

13. The system for improving resolution in color image data according to claim 10 wherein said smoothing filter is a median filter for outputting a median value.

14. The system for improving resolution in color image data according to claim 10 wherein said smoothing filter is a low-pass filter for outputting a median value.

15. The system for improving resolution in color image data according to claim 8 wherein said single-plane color image sensor is one dimensional.

16. The system for improving resolution in color image data according to claim 8 wherein said single-plane color image sensor is two dimensional.

17. The system for improving resolution in color image data according to claim 16 wherein said single-plane color image sensor is at least three by three of said color-component specific photo elements.

18. The system for improving resolution in color image data according to claim 8 further comprising a parameter storage for storing multiple sets of parameters and a control unit connected to said parameter storage and said intensity estimator for selecting one of the sets of the parameters based upon a particular location in the spatial pattern.

19. A program storage device readable by a machine, tangibly embodying a program of instructions executable by the machine to perform method steps of reproducing a high-resolution image, said method steps comprising:

j) inputting color image data from a sensor having a specific unit pattern of color-component specific photo elements;

k) generating chroma values for each of the color-component specific elements from the color image data;

l) adjusting the chroma values according to the specific pattern of the color-component specific elements;

m) further adjusting the chroma values for smoothing the chroma values adjusted in said step l);

n) estimating an intensity value based upon the chroma values twice adjusted in said steps l) and m) and the color image data from said step j), the intensity value having a range equal to all of the color component specific photo elements, the intensity value being determined by the following equations, $$Y=(Y_0*CCD1)+(Y_1*C_r)+(Y_2*C_b)$$

$$Y_0=-C_G/C$$

$$Y_1=((R1*C_G)-(G1*C_R))/C$$

$$Y_2=((B1*C_G)-(G1*C_R))/C$$

$$C=-G+(G1*C_R)-(R1*C_G)-(B1*C_G)+(G1*C_B)$$

Where Y is intensity of one of the color-component specific elements; CCD1 is a color image data value from a predetermined photo sensor element; $C_r$ and $C_t$ are the chroma values; R1, G1 and B1 are a portion of the first matrix; $C_R$, $C_B$ and $C_G$ are predetermined constants;

o) adjusting the intensity value for an improved edge characteristic after said step n); and p) generating RGB data based upon the chroma values adjusted in said step m) and the intensity value adjusted in said step o).

* * * * *